(No Model.)
S. PARK.
WEIGHING DELIVERY WAGON.
No. 328,138. Patented Oct. 13, 1885.
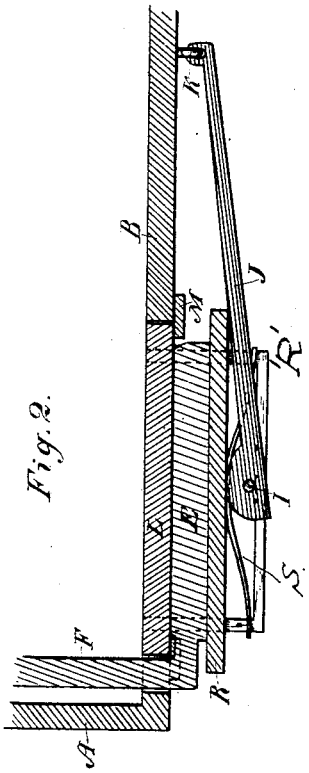
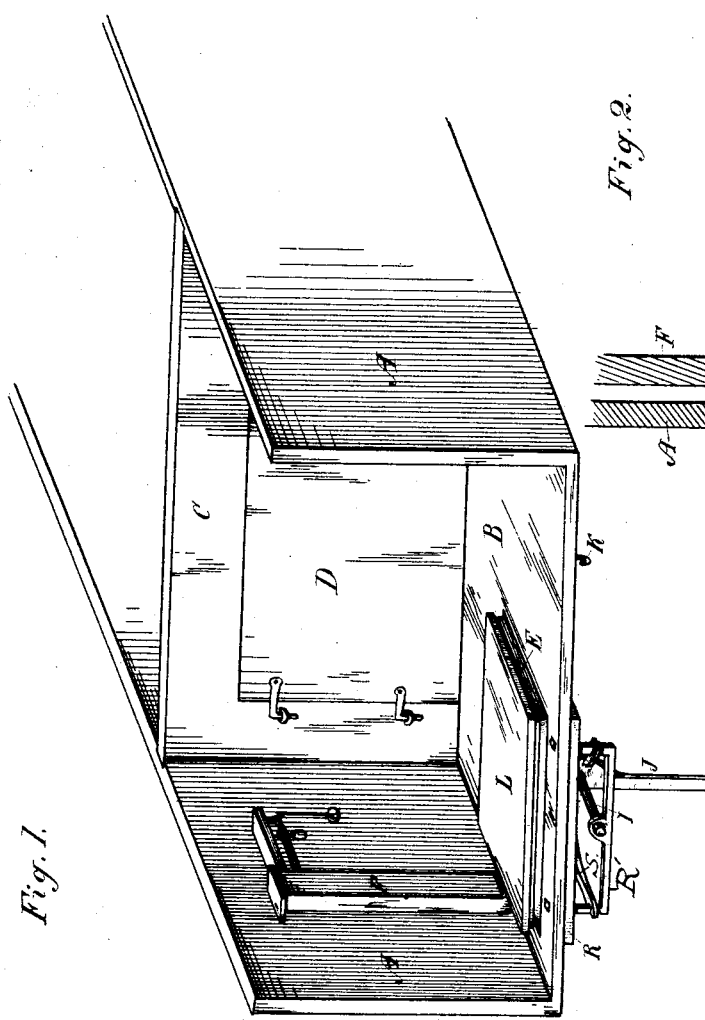
Witnesses,
Geo. H. Strong.
J. S. Fowler.
Inventor,
Shubael Park
By Dewey & Co.
Attorneys
N. PETERS. Photo-Lithographer. Washington, D. C.

UNITED STATES PATENT OFFICE.

SHUBAEL PARK, OF OAKLAND, CALIFORNIA.

WEIGHING DELIVERY-WAGON.

SPECIFICATION forming part of Letters Patent No. 328,138, dated October 13, 1885.

Application filed January 5, 1885. Serial No. 152,032. (No model.)

*To all whom it may concern:*

Be it known that I, SHUBAEL PARK, of Oakland, Alameda county, State of California, have invented an Improvement in a Weighing Delivery-Wagon; and I hereby declare the following to be a full, clear, and exact description of the same.

My invention relates to a device for transporting and weighing articles in bulk; and it consists in the combination of devices, all of which will be claimed and fully explained by reference to the accompanying drawings, in which—

Figure 1 is a perspective view showing the rear portion of the wagon, scale, and attachments. Fig. 2 is a vertical section taken through the floor of the wagon and the scale.

A is the body of a cart or wagon, which may be mounted upon suitable wheels, and B is the floor.

A partition or back-board, C, is fitted across from side to side of the wagon at such a point as to leave the rear portion of the floor unoccupied by the contents of the wagon. D is a door made in this rear partition, through which the coal or other material may be taken out when desired.

Through the rear portion of the floor B an opening is made of sufficient size to receive the platform E of a scale, the upright or standard F lying next to the side of the wagon, with the weighing-arm or scale-beam G extending alongside the wagon, as shown, where it will be out of the way of injury.

Below the platform of the scale is the bed R, upon which it rests. A frame-work, R', extends downward from the wagon-bed, having journaled across it a shaft, I, which serves as the fulcrum for a cam-lever, J. When the outer end of this lever is carried up beneath the wagon-floor, it may be supported by a hook, K, and the platform of the scale will then be allowed to sink below the level of the floor, so as to be out of the way.

In order to more completely protect it, a board or cover, L, is fitted over the top of the scale-platform, and is made of somewhat larger dimensions, so that when the platform is lowered this board will rest upon the shoulders or strips which are secured beneath the floor or bottom of the wagon, as shown at M. By this arrangement the scale is entirely out of the way and will not be damaged by articles which are being loaded into or taken out of the wagon when the scale is not in use.

When it is desired to use the scale, the lever J is detached from the holder K and the long arm pressed downward, so that the short arm or cam will act to raise the platform of the scale above the level of the wagon floor or bottom, so that when articles are placed upon it they can be weighed.

In order to relieve the scale of any danger or jarring from blows or jarring from the motion of the vehicle, I employ springs S, which are interposed between the fulcrum I and the scale-bed R, so as to support the scale in an elastic manner and prevent jarring. By this construction I am enabled to load coal, potatoes, or other articles into the wagon in bulk, and when they are brought to any place for delivery the door D may be opened and the quantity which is to be delivered may be placed upon the scale and weighed in the presence of the customer. The lever and the spring serve to remove the scale from any danger of injury or jarring while it is not in use.

Having thus described my invention, what I claim as new, and desire to secure by Letters Patent, is—

1. The combination, with a vehicle having an opening made in its floor, of a scale supported within the opening and a lever, whereby the scale may be raised above the level of the floor or depressed beneath it, substantially as and for the purpose set forth.

2. The combination, with a vehicle having an opening made in its floor, of a scale supported within the opening, a lever by which the scale may be raised above the level of the floor or depressed beneath it, and a cover which fits the opening and protects the scale when the latter is depressed, substantially as herein described.

3. The combination, with a vehicle having an opening in its floor, of a scale supported in line with the opening, a lever by which the scale may be raised or lowered, and a spring by which the scale may be relieved from jars, substantially as herein described.

In witness whereof I have hereunto set my hand.

SHUBAEL PARK.

Witnesses:
S. H. NOURSE,
H. C. LEE.